Patented Feb. 2, 1932

1,843,355

UNITED STATES PATENT OFFICE

ABRAHAM SIDNEY BEHRMAN, OF CHICAGO, ILLINOIS

HALIDE PREPARATION

No Drawing.   Application filed November 23, 1929. Serial No. 409,424.

This invention relates to a method of halide preparation.

More specifically, the invention relates to a method for the preparation of bromides and other halides of alkali metals, alkaline earth metals and other elements or radicals, capable of forming positive ions in aqueous solution.

In a copending application, Serial No. 370,737, filed June 13, 1929, there is described a method for the production of hydrochloric acid, and other halogen acids, by the action of a halogen, water, and carbon. The carbon employed for this purpose is preferably but not necessarily the "activated" variety, of which several suitable grades are now commercially available. The chemical reactions by which the synthesis described presumably functions, may be shown in the following condensed equations:

(1) $2Cl_2 + 2H_2O + C = 4HCl + CO_2$ (2) $2Br_2 + 2H_2O + C = 4HBr + CO_2$

Using the process of the copending application referred to, it is readily possible to prepare hydrochloric and hydrobromic acids.

The present invention employs the same basic principle as the copending application, modified to permit the production of a halide direct from the proper halogen, carbon, and a suitable metal, salt, compound or other substance capable of forming the desired halide.

As an example of one of the several possible methods of carrying out the process of this invention, I will describe the preparation of sodium bromide from bromine, activated carbon, and a solution of a sodium compound, such as sodium carbonate. This method is a particularly useful one, as many processes of recovering bromine from its its naturally occurring compounds consist essentially of the liberation and separation of liquid or gaseous bromine, whereas the bromine is for the most part in demand, and therefore most commercially utilizable in the form of relatively pure alkali metal bromides. The present invention provides a simple and direct method of converting the free bromine into the more generally desirable bromide, without the necessity of cumbersome and expensive intermediate processes.

In a specific exemplification of this method which I have successfully employed, I take a solution of sodium carbonate containing approximately 66 grams of anhydrous sodium carbonate per liter, and dissolve in it a quantity of bromine sufficient, when converted to hydrobromic acid according to Equation (2), to neutralize the alkalinity of the sodium carbonate. The solution of the bromine in the alkaline solution is readily accomplished, with the evolution of a considerable amount of carbon dioxide gas, the reaction apparently taking place according to the following equation:

(3) $Na_2CO_3 + Br_2 + H_2O = NaBr + NaBrO + H_2O + CO_2$

The solution is now passed through, or otherwise treated with, activated carbon, whereupon the sodium hypobromite is converted to sodium bromide, presumably according to the following equation:

(4) $2NaBrO + C = 2NaBr + CO_2$

The progress of the above reaction may be followed qualitatively by the appearance of the solution, which changes from a deep red color to a very pale yellowish green, or even to water whiteness. The red brown fumes of the untreated solution are entirely absent in the solution which has been adequately treated with the carbon. This solution will now contain about 128 grams per liter of sodium bromide. It may also contain small amounts of hydrobromic acid and/or bromine, as well as traces of impurities extracted from the carbon or other raw materials employed. The solution may be freed from these impurities by evaporation and recrystallization, though the latter step will usually not be found necessary unless a final product of extreme purity is required.

Although it is not essential, I prefer in general to use the bromine and alkali in such proportions that the final solution after the carbon treatment is acid—that is, the pH is less than 7.0. With these proportions it seems that the reaction of the solution with the carbon proceeds more rapidly and completely than otherwise. I am not certain why this is so; but it is conceivable that the conversion of sodium hypobromite to sodium bromide shown in equation (4) does not take place directly as indicated, but through the intermediate agency of hydrobromic acid. If such is the case, the progress of the reaction would presumably be facilitated by an acid condition of the solution, particularly when the acidity was due to hydrobromic acid.

Another reason that I prefer in general to work with acid end-products is that apparently there is less tendency for any halogen in solution to form a complex ion, or to enter into combinations such as $NaBr_3$, as such complexes seem to retard the action of the contained halogen and the carbon. If, under the conditions of carrying out the process of the invention, a final solution is obtained which contains essentially, for example, sodium bromide and $NaBr_3$, the latter compound may be converted to the bromide by heating the residue obtained on evaporation of the solution:

(5) $NaBr_3 = NaBr + Br_2$

The exemplification of the process of this invention which has been described may be employed as a continuous or intermittent method, or a combination of both. For example, the solution of the halogen may be prepared either continuously or in batches; the subsequent treatment with carbon may likewise be carried out intermittently or continuously; and so on, even to the final recovery of the dry halide, either continuous or intermittent methods may be employed. When a continuous method of preparation is desired utilizing the gaseous halogen, the process described in my copending application referred to may be very advantageously employed, substituting for the water therein employed, an appropriate alkaline solution or other material capable of forming the desired halide. In such a system, for example, bromine gas would be introduced under pressure at the lower portion of a receptacle containing activated carbon. As the bromine rises through the carbon it is met by an alkaline solution, e. g. of sodium carbonate, trickling down through the carbon. The solution of sodium bromide resulting from the action of the bromine, sodium carbonate and carbon, is suitably separated and recovered. Provision may be made for continuous renewal of the supply of carbon, for the removal of spent carbon, and for any re-activation of the carbon, e. g. with steam or hot air, which may be found desirable.

This process may also be desirably modified so as to prepare the halides of volatile bases. For example, ammonium bromide may be prepared by passing gaseous ammonia and bromine upwardly through a bed of charcoal and by causing a stream of water to trickle down through the bed and adsorb the ammonium bromide thus formed. It is also possible to utilize the present invention in conjunction with other materials than water.

Insoluble halides, such as a silver, are produced by precipitation from the reaction mixture from the carbon bed. In certain cases the metallic or base containing component is mixed with the carbon bed so that the halide will be formed as the halogen or its solution passes through or into contact with the bed. As an example, calcium carbonate is utilized as an economical source of calcium for the preparation of calcium bromide or other halides.

It will be obvious that there is considerable choice possible in the alkali metal or alkaline earth compound or other substance employed for reaction with the halogen and carbon. For example, under certain conditions it has been found possible to utilize other alkaline reacting sodium, potassium or alkaline earth compounds in place of sodium carbonate or sodium hydroxide. Furthermore, the method of procedure employed may be varied widely in details. All such modifications are considered to come within the scope of the present invention. Again, as pointed out in the co-pending application previously referred to describing the synthesis of halogen acids, other forms of carbon, such as wood charcoal, bone char, lignite and other utilizable varieties of carbon may be employed instead of the so-called "activated" carbon made use of in the preferred example.

What is claimed is:

1. A method of preparing a metallic halide which comprises reacting together carbon, a halogen, water and a substance containing the metallic constituent of the desired halide.

2. A method of producing alkali metal bromides which comprises reacting together a soluble alkaline-reacting alkali metal compound, water carbon and bromine.

3. A method of producing alkali metal bromides which comprises reacting together bromine, activated carbon and a solution of an alkaline-reacting alkali metal compound.

4. A process of forming bromides which comprises dissolving bromine in a solution of sodium carbonate and then causing the resulting mixture to contact with carbon.

5. A process of forming bromides which comprises dissolving bromine in an aqueous solution of an alkali and then causing the resulting aqueous mixture to contact with carbon.

6. A method of producing halides which comprises contacting a halogen, carbon and an aqueous solution of an alkali, removing the resulting reaction mixture from the carbon and then recovering the halide from said reaction mixture.

7. A method of producing bromides which comprises reacting bromine, carbon and an aqueous solution of an alkali, removing the resulting reaction mixture from the carbon and then recovering the halide from said reaction mixture by vaporation.

8. A method of producing bromides, which comprises reacting together an alkaline reacting compound containing the positive radical of the desired halide, bromine, water, and a reducing agent which will dissolve only to the extent required for the reaction.

9. A method of producing halides, which comprises reacting together carbon, a halogen, water, and a fluid reagent capable of supplying the positive radical of the desired halide.

10. A method of producing halides, which comprises reacting together a halogen, water, an excess of a water insoluble reducing agent which will dissolve only to the extent required for the reaction, and a fluid reagent capable of supplying the positive radical of the desired halide.

11. In the preparation of halides, the steps which comprise reacting together a halogen, carbon, water, and a reagent cable of supplying the positive radical of the desired halide, and separating any unused carbon.

12. The process of treating an aqueous solution of bromine, which comprises contacting said solution with carbon and a reagent capable of supplying the positive radical of the desired bromide.

13. The process of recovering bromine from aqueous solutions containing the same, which comprises contacting said aqueous solution with carbon and a metal, whereby the bromide of said metal is formed.

14. The process of forming bromides, which comprises contacting an aqueous solution of hydrogen bromide with carbon and a metal, whereby the bromide of said metal is formed.

In testimony whereof I have subscribed my name to the foregoing specification and claims.

ABRAHAM SIDNEY BEHRMAN.

CERTIFICATE OF CORRECTION.

Patent No. 1,843,355.  Granted February 2, 1932, to

ABRAHAM SIDNEY BEHRMAN.

It is hereby certified that error appears in the printed specification of the above numbered patent requiring correction as follows: Page 2, line 89, beginning with the word "Again" strike out all to and including the word "example" in line 96, and before the word "All" in line 87, insert the words Again, as pointed out in the co-pending application previously referred to describing the synthesis of halogen acids, other forms of carbon, such as wood charcoal, bone char, lignite and other utilizable varieties of carbon may be employed instead of the so-called "activated" carbon made use of in the preferred example.; and that the said Letters Patent should be read with this correction therein that the same may conform to the record of the case in the Patent Office.

Signed and sealed this 5th day of April, A. D. 1932.

(Seal)

M. J. Moore,
Acting Commissioner of Patents.